US011448437B2

(12) United States Patent
Ryu et al.

(10) Patent No.: US 11,448,437 B2
(45) Date of Patent: Sep. 20, 2022

(54) AIR CONDITIONER FOR VEHICLE

(71) Applicant: HANON SYSTEMS, Daejeon (KR)

(72) Inventors: Jae Chun Ryu, Daejeon (KR); Dae Bok Keon, Daejeon (KR); Yun Jin Kim, Daejeon (KR); Se Min Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 12 days.

(21) Appl. No.: 16/497,110

(22) PCT Filed: Mar. 29, 2018

(86) PCT No.: PCT/KR2018/003729
§ 371 (c)(1),
(2) Date: May 28, 2021

(87) PCT Pub. No.: WO2018/190540
PCT Pub. Date: Oct. 18, 2018

(65) Prior Publication Data
US 2021/0278113 A1  Sep. 9, 2021

(30) Foreign Application Priority Data
Apr. 10, 2017  (KR) ........................ 10-2017-0046073

(51) Int. Cl.
*F25B 41/26*  (2021.01)
*F25B 13/00*  (2006.01)

(52) U.S. Cl.
CPC .............. *F25B 41/26* (2021.01); *F25B 13/00* (2013.01)

(58) Field of Classification Search
CPC ........ F25B 13/00; F25B 41/26; F25B 41/325; F25B 41/40; F25B 2339/047;
(Continued)

(56) References Cited

U.S. PATENT DOCUMENTS 10,661,632 B2    5/2020  Lee et al.
2013/0227973 A1*  9/2013  Kang ...................... F25D 21/12
                                                              62/80

FOREIGN PATENT DOCUMENTS

JP    2013075628 A  *  4/2013
JP    2015186989 A     10/2015
(Continued)

OTHER PUBLICATIONS

English translation of JP-2013075628-A (Year: 2021).*
(Continued)

*Primary Examiner* — Emmanuel E Duke
(74) *Attorney, Agent, or Firm* — Dickinson Wright PLLC

(57) ABSTRACT

The present invention relates to an air conditioner for a vehicle which includes an integrated heat pump system having an electronic part waste heat recovery device to enhance heating performance and which can cool a battery of an electric vehicle using refrigerant in a cooling mode. The air conditioner for a vehicle includes a refrigerant circulation system for performing cooling or heating of the interior of the vehicle by circulating refrigerant. The air conditioner further includes a first refrigerant pipe exchanging heat with a battery system of the vehicle in sequence to selectively exchange heat between refrigerant of the refrigerant circulation system and a coolant of the first coolant pipe.

8 Claims, 5 Drawing Sheets

(58) Field of Classification Search
CPC ..... F25B 2400/0403; F25B 2400/0409; B60H 1/00278; B60H 1/00271; B60H 1/00385; B60H 1/00392; B60H 1/00885; B60H 1/00899; B60H 1/00914; B60H 1/143; B60H 1/32284; B60H 1/323; B60H 2001/00307; B60H 2001/00928; B60H 2001/00949

See application file for complete search history.

(56) References Cited

FOREIGN PATENT DOCUMENTS

| | | | | |
|---|---|---|---|---|
| JP | 5831108 B2 | 12/2015 | | |
| KR | 20120103054 A | 9/2012 | | |
| KR | 101316355 B1 | 10/2013 | | |
| KR | 20140001410 A | * | 1/2014 | ......... B60H 1/00921 |
| KR | 20140001410 A | | 1/2014 | |
| KR | 20150093590 A | | 8/2015 | |
| KR | 20160129165 A | | 11/2016 | |

OTHER PUBLICATIONS

English translation of KR-20140001410-A (Year: 2021).*
Written Opinion of the International Searching Authority for International Application No. PCT/KR2018/003729; dated Jul. 13, 2018; 7 pages.
International Search Report (ISR) for International Application No. PCT/KR2018/003729; dated Jul. 13, 2018; 5 pages; English Translation of the ISR is Included.

* cited by examiner

PRIOR ART

PRIOR ART

AIR CONDITIONER FOR VEHICLE

CROSS-REFERENCE TO RELATED APPLICATIONS

This application is a U.S. National Stage of International Patent Application Serial No. PCT/KR2018/003729, filed Mar. 29, 2018, and titled "Air Conditioner for Vehicle", which claims the benefit of Korean Patent Application Serial No. 10-2017-0046073, filed Apr. 10, 2017, and titled "Air Conditioner for Vehicles", the entire disclosures of each of the above applications are hereby incorporated by reference.

TECHNICAL FIELD

The present invention relates to an air conditioner for a vehicle, and more particularly, to an air conditioner for a vehicle, which includes an integrated heat pump system having an evaporator and a condenser respectively mounted in a first air passageway and a second air passageway to perform cooling and heating.

BACKGROUND ART

In general, an air conditioner for a vehicle is an apparatus for cooling or heating the interior of the vehicle by cooling or heating through the process of introducing outdoor air into the interior of the vehicle or circulating indoor air of the vehicle. Such an air conditioner for a vehicle includes an evaporator for cooling the inside of an air-conditioning case; a heater core for heating the inside of the air-conditioning case; and a mode converting door for selectively blowing the air cooled by the evaporator or heated by the heater core toward parts of the interior of the vehicle.

Such an air conditioner includes: a compressor for compressing and discharging refrigerant; a condenser for condensing the refrigerant of high pressure discharged from the compressor; an expansion valve for throttling the refrigerant condensed and liquefied in the condenser; and an evaporator for exchanging heat between the liquefied refrigerant of low pressure throttled by the expansion valve and air blown to the interior of the vehicle and evaporating the refrigerant to cool the air discharged to the interior of the vehicle due to heat absorption by evaporative latent heat, and a cooling cycle of the air conditioner is configured such that the compressor, the condenser, the expansion valve and the evaporator are connected with each other via refrigeration pipes.

Recently, heat pump systems which perform heating and cooling only using the cooling cycle have been developed. FIG. 1 is a view showing a cooling mode of a conventional heat pump system for a vehicle, and FIG. 2 is a view showing a heating mode of the conventional heat pump system for a vehicle. As shown in FIGS. 1 and 2, the heat pump system for the vehicle includes an air-conditioning case 10 in which a cold air passageway 11 and a warm air passageway are partitioned from each other, an evaporator 4 disposed on the cold air passageway 11 for cooling, and a condenser 2 disposed on the warm air passageway 12 for heating.

An air outflow port 15 for supplying air to the interior of the vehicle, and an air discharge port 16 for discharging air to the outside are formed at an outlet of the air-conditioning case 10. Blowers 20 are respectively disposed at inlets of the cold air passageway 11 and the warm air passageway 12 to be actuated individually.

A compressor 1, the condenser 2, an expansion valve 3, and the evaporator 4 are disposed in a refrigerant line 5 in sequence. A water cooling line 7 branches off from the refrigerant line 5 between the compressor 1 and the condenser 2, and a water cooling condenser 32 is disposed in the water cooling line 7. A three-way valve 31 which makes refrigerant selectively pass or bypass the water cooling condenser 32 is disposed at a branching point between the refrigerant line 5 and the water cooling line 7. A check valve 37 for preventing the refrigerant of the refrigerant line 5 from flowing backwards to the water cooling condenser 32 is disposed in the water cooling line 7.

A low temperature radiator (LTR) 34 is disposed in the vehicle, and a blower 35 may be mounted at one side of the low temperature radiator 34. A power electric module 36 which is a device for driving an inverter, a driving motor, and so on is disposed in an electric vehicle. Heat generated from the power electric module 36 exchanges heat with coolant of a coolant line 8 passing through the power electric module 36, and then, is radiated while passing through the low temperature radiator 34. The coolant line 8 passes the water cooling condenser 32, and the coolant exchanges heat with the refrigerant of the water cooling line 7. A water pump 33 is disposed in the coolant line 8.

Referring to FIG. 1, in a heating mode, warm air heated while passing through the condenser 2 of a warm air passageway 12 is discharged to the interior of the vehicle through an air outflow port 15 in sequence to heat the interior of the vehicle, and at the same time, cold air cooled while passing through the evaporator 4 of a cold air passageway 11 is discharged to the outside of the vehicle through an air discharge port 16. Moreover, refrigerant of the refrigerant line 5 flows through the compressor 1, the condenser 2, the expansion valve 3 and the evaporator 4 in a sequence, but there is no heat exchange between the refrigerant and the coolant in the water cooling condenser 32.

Referring to FIG. 2, in a cooling mode, the cold air cooled while passing through the evaporator 4 of the cold air passageway 11 is discharged to the interior of the vehicle through the air outflow port 15 to cool the interior of the vehicle, and at the same time, the warm air heated while passing through the condenser 2 of the warm air passageway 12 is discharged to the outside of the vehicle through the air discharge port 16. Furthermore, the refrigerant of the refrigerant line 5 flows through the compressor 1, the water cooling condenser 32, the condenser 2, the expansion valve 3, and the evaporator 4 in a sequence. The coolant of the coolant line 8 passes through the power electric module 36 and the low temperature radiator 34, and then, exchanges heat with the refrigerant of the water cooling line 7 while passing through the water cooling condenser 32.

In the meantime, a conventional air conditioner having a heat pump system structure installed in an electric vehicle has a structure to transfer heat to refrigerant utilizing a chiller for recovering waste heat of electronic parts in sequence to enhance performance in the heating mode. A general electric vehicle is equipped with a battery heat management system for expanding the lifespan of a battery, and adopts a method of inhaling indoor cold air in sequence to cool the battery.

The conventional air conditioner for a vehicle having the heat pump system structure deteriorates cooling performance due to a loss of cold air since needing a cooling system for inhaling interior cold air to cool the battery.

DISCLOSURE

Technical Problem

Accordingly, the present invention has been made in view of the above-mentioned problems occurring in the prior art, and it is an object of the present invention to provide an air conditioner for a vehicle which includes an integrated heat pump system having an electronic part waste heat recovery device to enhance heating performance and which can cool a battery of an electric vehicle using refrigerant in a cooling mode.

Technical Solution

To accomplish the above object, according to the present invention, there is provided an air conditioner for a vehicle having a refrigerant circulation system for performing cooling or heating of the interior of the vehicle by circulating refrigerant, including a first refrigerant pipe exchanging heat with a battery system of the vehicle in sequence to selectively exchange heat between refrigerant of the refrigerant circulation system and a coolant of the first coolant pipe.

Advantageous Effects

As described above, the air conditioner for a vehicle according to the present invention can prevent deterioration of cooling performance, additionally enhance heating performance, and effectively cool the battery since the air conditioner does not require an additional cooling system for cooling the battery and not use indoor cold air.

MODE FOR INVENTION

Hereinafter, technical structure of an air conditioner for a vehicle according to exemplary embodiments of the present invention will be described with reference to the accompanying drawings.

Figure 1:
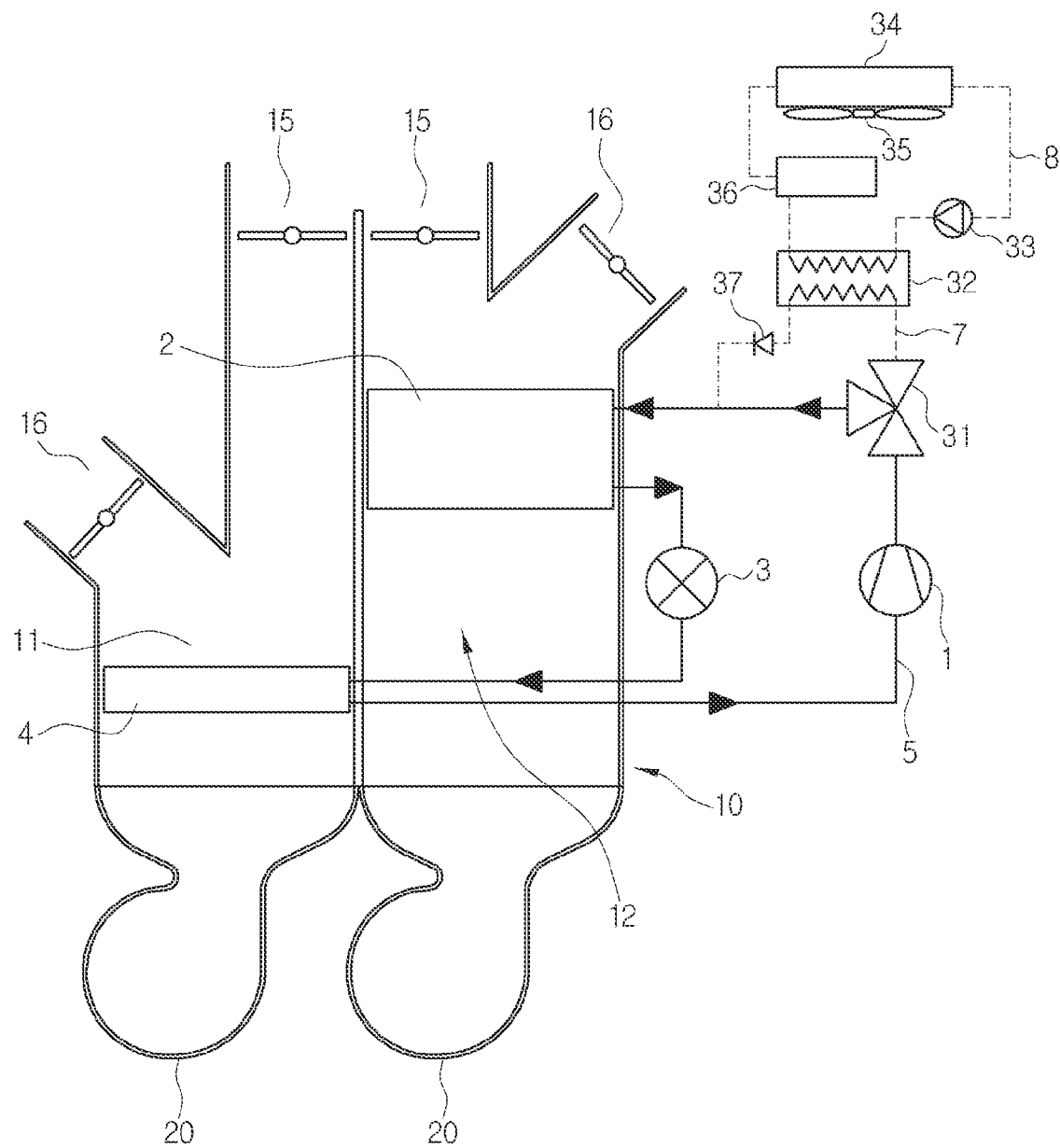
FIG. 1 is a view showing a cooling mode of a conventional heat pump system for a vehicle.
Figure 2:
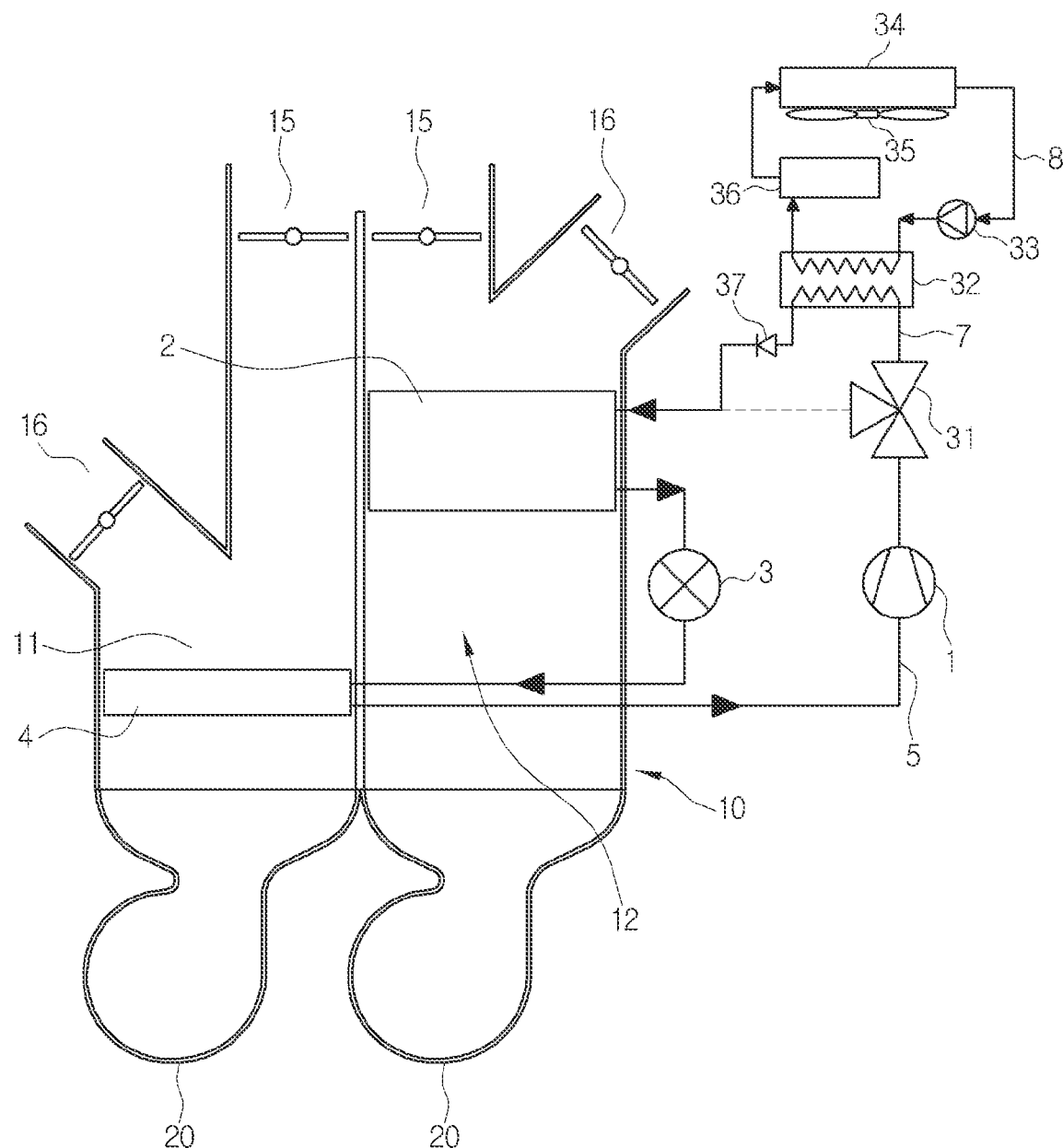
FIG. 2 is a view showing a heating mode of the conventional heat pump system for a vehicle.
Figure 3:
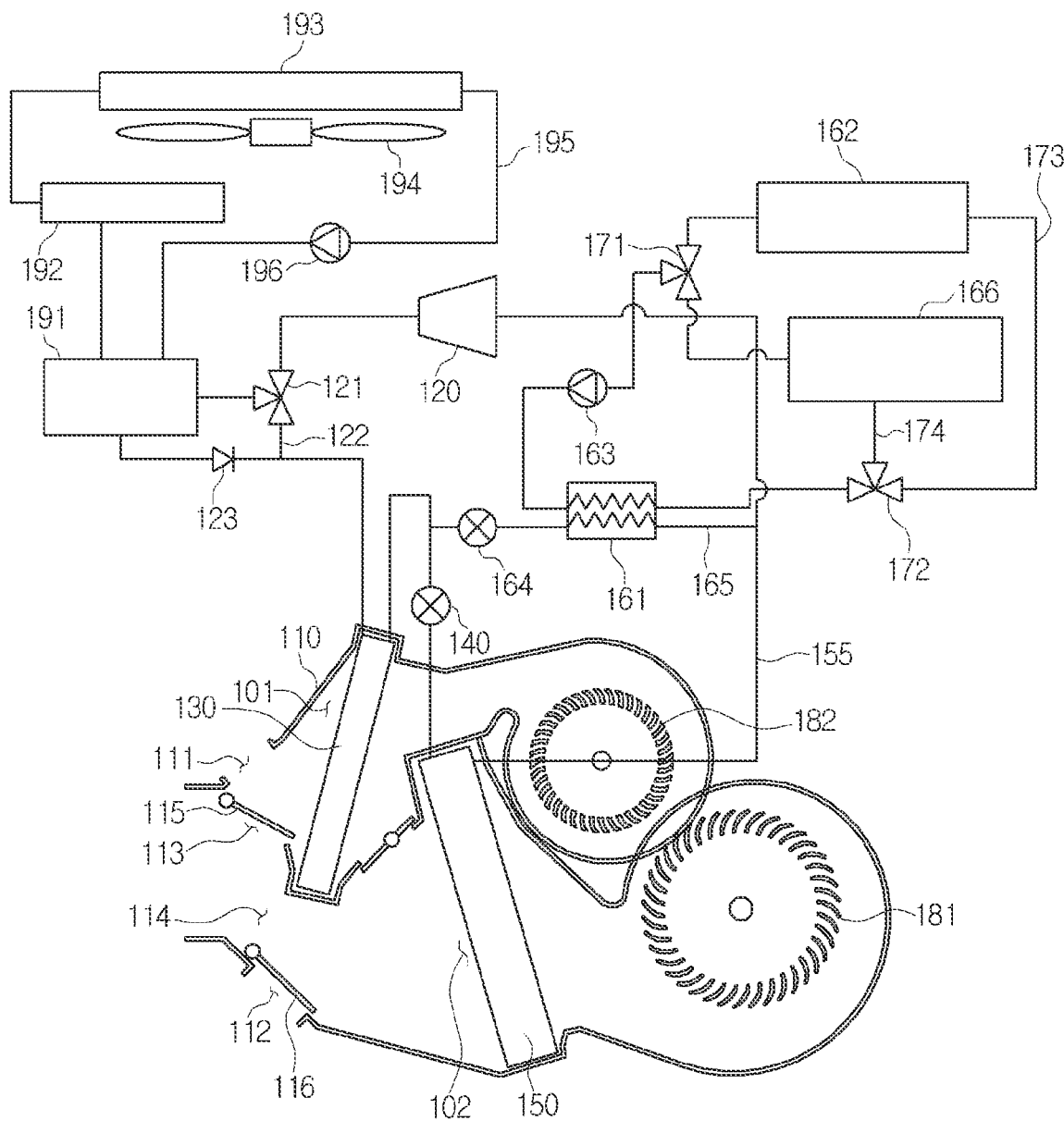
FIG. 3 is a configurative view showing an air conditioner for a vehicle according to an embodiment of the present invention.

FIG. 3 is a configurative view showing an air conditioner for a vehicle according to an embodiment of the present invention.

As shown in FIG. 3, the air conditioner for a vehicle according to the embodiment of the present invention includes a refrigerant circulation system for circulating refrigerant to cool and heat the interior of the vehicle.

In more detail, in the air conditioner for a vehicle according to the embodiment of the present invention, the refrigerant circulation system is an integrated heat pump system which has a refrigerant cycle with a single flow direction and arranges cold air passing through an evaporator 150 and warm air passing through a condenser 130 in different passageways to cool or heat the interior of the vehicle. Such an air conditioner may fulfill as a main air conditioner or may be mounted at a suitable place, such as below a seat or on the ceiling, as an auxiliary air conditioner for assisting the main air conditioner.

The air conditioner for a vehicle includes an air-conditioning case 110, an evaporator 150, a condenser 130, a compressor 120, an expansion means, a first blower 182, and a second blower 181. The refrigerant circulation system is configured of the compressor 120, the condenser 130, the expansion means, and the evaporator 150 mounted in a refrigerant pipe 155 in sequence.

In the air-conditioning case 110, a first air passageway 101 and a second air passageway 102 are partitioned from each other. Indoor air or outdoor air selectively flows in through the first air passageway 101, and also indoor air or outdoor air selectively flows in through the second air passageway 102. Moreover, the air-conditioning case 110 has an air inflow port and an air outflow port. Air flows in into the air-conditioning case 110 through the air inflow port, and is discharged out from the air-conditioning case 110 through the air outflow port.

The air inflow port includes an indoor air inlet and an outdoor air inlet, an opening and closing door for selectively opening and closing the indoor air inlet and the outdoor air inlet, and an actuator for actuating the opening and closing door.

The air outflow port includes a warm air outflow port 113 and a warm air discharge port 111 which are formed in the first air passageway 101, and a cold air outflow port 114 and a cold air discharge port 112 formed in the second air passageway 102. The warm air outflow port 113 is to supply air passing through the condenser 130 to the interior of the vehicle, and the warm air discharge port 111 is to discharge the air passing through the condenser 130 to the outside of the vehicle. The cold air outflow port 114 is to supply the air passing through the evaporator 150 to the interior of the vehicle, and the cold air discharge port 112 is to discharge the air passing through the evaporator 150 to the outside of the vehicle.

The air-conditioning case 110 has a cold air mode door 116 and a warm air mode door 115 disposed therein. The cold air mode door 116 is disposed in the second air passageway 102, and the warm air mode door 115 is disposed in the first air passageway 101. The cold air mode door 116 is rotatably disposed between the cold air outflow port 114 and the cold air discharge port 112 in sequence to selectively discharge air to the cold air outflow port 114 and the cold air discharge port 112. The warm air mode door 115 is rotatably disposed between the warm air outflow port 113 and the warm air discharge port 111 in sequence to selectively discharge air to the warm air outflow port 113 and the warm air discharge port 111.

The evaporator 150 is disposed on the second air passageway 102. The evaporator 150 exchanges heat between liquid-phase refrigerant of low pressure discharged from the expansion means, which will be described later, and the inside air of the air-conditioning case 110 so as to cool air due to heat absorption by evaporative latent heat of refrigerant.

The condenser 130 is disposed on the first air passageway 101. The condenser 130 exchanges heat between gas-phase refrigerant of high-temperature and high-pressure discharged from the compressor 120, which will be described later. In this process, the refrigerant is condensed and air is heated.

The compressor 120 is an electro-compressor actuated by electric energy. The compressor 120 inhales and compresses gas-phase refrigerant of low-temperature and low-pressure passing through the evaporator 150, and then, discharges the refrigerant in a gas phase of high-temperature and high-pressure to the condenser 130.

The expansion means rapidly expands the liquid-phase refrigerant discharged from the condenser 130 by a throttling action, and sends the refrigerant in a wet-saturated state of low-temperature and low-pressure to the evaporator 150. The expansion means 140 may adopt one of an EXV, a TXV, and an orifice structure.

The first blower 182 is arranged in the first air passageway 101. Moreover, the second blower 181 is arranged in the second air passageway 102. Each of the first blower 182 and the second blower 181 includes a fan, a motor for driving the fan, and others.

The air conditioner for a vehicle selectively is configured to supply indoor air and outdoor air to the evaporator 150 and the condenser 130. In a cooling mode, indoor air exchanges heat with the evaporator 150 and is supplied to the interior of the vehicle, and outdoor air exchanges heat with the condenser 130 and is discharged to the outside of the vehicle. In a heating mode, indoor air exchanges heat with the condenser 130 and is supplied to the interior of the vehicle, and outdoor air exchanges heat with the evaporator 150 and is discharged to the outside of the vehicle.

The air conditioner for a vehicle according to the embodiment of the present invention includes a first coolant pipe 173, a second coolant pipe 174, and a third coolant pipe 195. Coolants flow in the first coolant pipe 173, the second coolant pipe 174 and the third coolant pipe 195, and the coolant may be water. However, the coolants are not limited to cooling water.

The air conditioner for a vehicle according to the embodiment of the present invention includes a thermal management system for an electric vehicle. A battery system 162 may be compatible with the term of "battery", and in this embodiment, means an electric energy charging system which is charged and discharged like a battery, a battery pack, a capacitor, or a super capacitor. Furthermore, the air conditioner for a vehicle according to the embodiment of the present invention may be applied to electric vehicles (EV), plug-in hybrid electric vehicles (PHEV), hybrid electric vehicles (HEV), and other hybrid electric vehicles using a plurality of propulsion sources including an electric power system.

The first coolant pipe 173 exchanges heat with the battery system 162 of the vehicle. The refrigerant of the refrigerant circulation system and the coolant of the first coolant pipe 173 selectively exchange heat. In this embodiment, the refrigerant of the refrigerant circulation system and the coolant of the first coolant pipe 173 always exchange heat, but it is also possible that the refrigerant and the coolant exchange heat selectively by an opening and closing means disposed at a branching point between the refrigerant pipe 155 and a refrigerant branch pipe 165 which will be described later.

The second coolant pipe 174 exchanges heat with at least one drive train component 166. The drive train component 166 may be, for instance, an electric motor, an electronic component, an inverter, or others of an electric vehicle. The air conditioner for a vehicle includes a valve system. The valve system selectively connects the first coolant pipe 173 and the second coolant pipe 174 to circulate the coolant to at least one among the battery system 162 and the drive train component 166. A first circulation pump 163 for circulating the coolant is disposed in the first coolant pipe 173.

In more detail, the valve system includes a first three-way valve 172 and a second three-way valve 171. The first three-way vale 172 is disposed at a connected portion between the first coolant pipe 173 and the second coolant pipe 174 located upstream of the battery system 162 in a coolant flow direction. The second three-way valve is disposed at a connected portion between the first coolant pipe 173 and the second coolant pipe 174 located downstream of the battery system 162 in the coolant flow direction.

The refrigerant branch pipe 165 branches off from the refrigerant pipe 155 between the condenser 130 and the evaporator 150. The refrigerant branch pipe 165 is a refrigerant passageway bypassing the evaporator 150. A chiller 161 which is a sort of heat exchangers is disposed at the refrigerant branch pipe 165. The refrigerant branch pipe 165 and the first coolant pipe 163 pass the chiller 161. The chiller 161 exchanges heat between the refrigerant of the refrigerant branch pipe 165 and the coolant of the first coolant pipe 173.

The refrigerant pipe 155 has a first expansion means 140 disposed at the upstream side of the evaporator 150 in the refrigerant flow direction. The refrigerant branch pipe 165 branches between the condenser 130 and the first expansion means 140 and joins between the evaporator 150 and the compressor 120. Additionally, a second expansion means 164 is disposed at the refrigerant branch pipe 165.

The first expansion means 140 is an expansion valve, and the second expansion means 164 is an expansion valve or an orifice. Therefore, the first expansion means 140 and the second expansion means 164 can control flow rate distribution between the evaporator 150 and the chiller 161 in the cooling mode or in the heating mode.

The third coolant pipe 195 exchanges heat with a power electric module 192 of the electric vehicle. The power electric module 192 is a device for driving an inverter, a driving motor, or the like. The third coolant pipe 195 has a second circulation pump 196 for circulating the coolant. A water cooling condenser 191 is disposed in the refrigerant pipe 155 between the compressor 120 and the condenser 130. The water cooling condenser 191 exchanges heat between the refrigerant of the refrigerant circulation system and the coolant of the third coolant pipe 195.

A bypass pipe 122 branches off from the refrigerant pipe 155 between the compressor 120 and the condenser 130, and a third three-way valve 121 is disposed at a branching point between the refrigerant pipe 155 and the bypass pipe 122 so that the refrigerant selectively passes or bypasses the water cooling condenser 191. A check valve 123 can be disposed in the refrigerant pipe 155 to prevent the refrigerant from flowing backwards.

A low temperature radiator (LTR) 193 is disposed in the vehicle, and a blower 194 may be mounted at one side of the low temperature radiator 193. The coolant flows through the power electric module 192, the low temperature radiator 193 and the water cooling condenser 191 in sequence by a second water pump. Heat generated from the power electric module 192 exchanges heat with the coolant of the third coolant pipe 195, which passes the power electric module 192, and then, is radiated while passing the low temperature radiator 193. The third coolant pipe 195 passes the water cooling condenser 191, and the coolant exchanges heat with the refrigerant of the refrigerant pipe 155.

Figure 4:
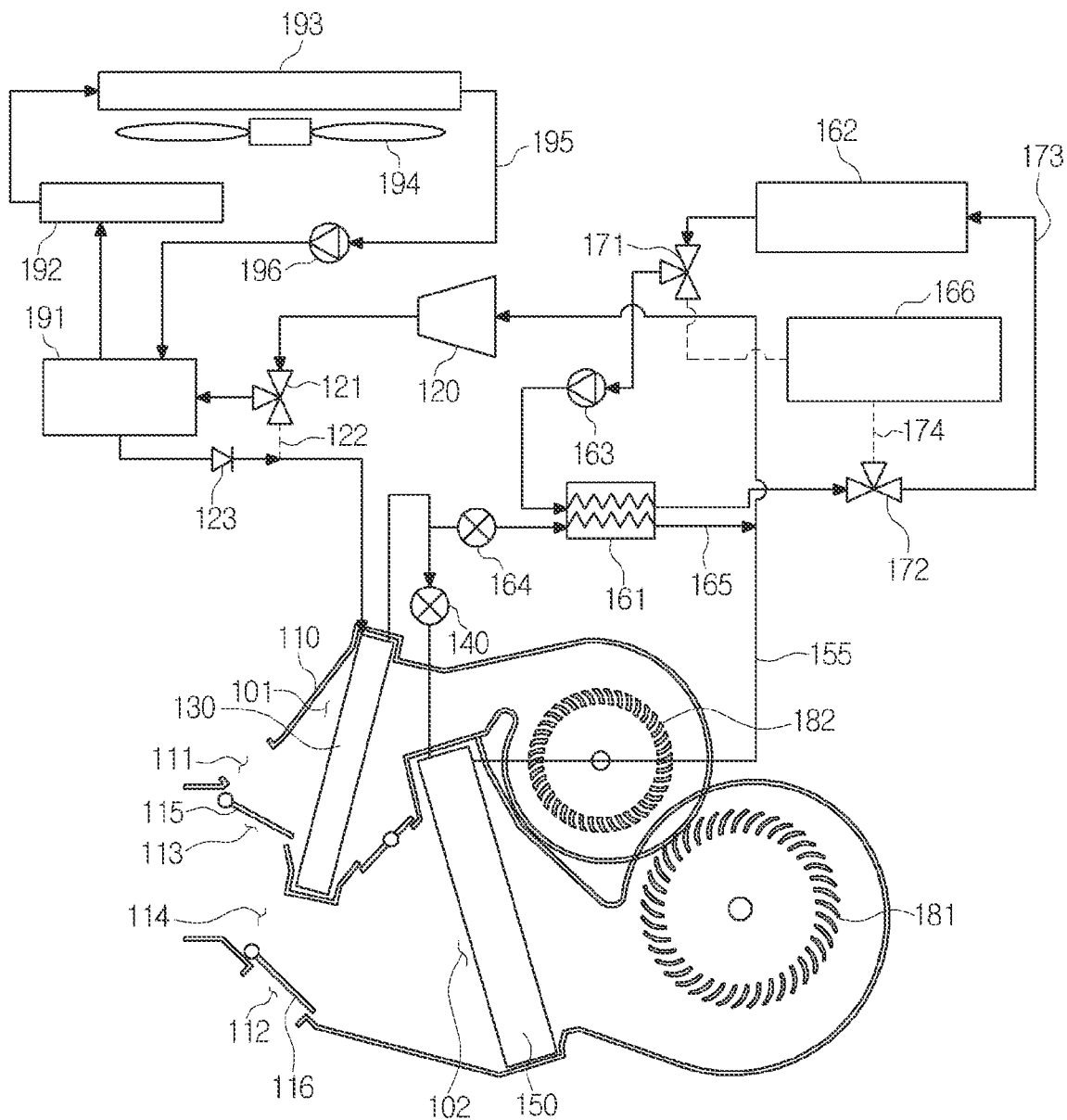
FIG. 4 is a view showing a cooling mode of the air conditioner for a vehicle according to the embodiment of the present invention.

FIG. 4 is a view showing the cooling mode of the air conditioner for a vehicle according to the embodiment of the present invention.

Referring to FIG. 4, in the cooling mode, the cold air cooled while passing through the evaporator 150 of the second air passageway 102 is discharged to the interior of the vehicle through the cold air outflow port 114 to cool the interior of the vehicle, and at the same time, the warm air heated while passing through the condenser 130 of the first air passageway 101 is discharged to the outside of the vehicle through the warm air discharge port 111.

The coolant of the third coolant pipe 195 passes through the power electric module 192, the low temperature radiator 193, and then, exchanges heat with the refrigerant of the refrigerant pipe 155 while passing the water cooling condenser 191.

The refrigerant of the refrigerant pipe 155 is discharged from the compressor 120, and exchanges heat with the coolant of the third coolant pipe 195 while passing the water cooling condenser 191 by actuation of the third three-way valve 121. After that, the refrigerant passes through the condenser 130, and then, some of the refrigerant is returned to the compressor 120 after passing through the first expansion means 140 and the evaporator 150, and the remainder is returned to the compressor 120 after passing through the second expansion means 164 and the chiller 161 along the refrigerant branch pipe 165. The refrigerant passing through the chiller 161 exchanges heat with the coolant of the first coolant pipe 173.

The coolant flowing in the first coolant pipe 173 passes the battery system 162, passes through the chiller 161 by actuation of the second three-way valve 171, and then, is returned to the battery system 162 by actuation of the first three-way valve 172. Temperature of the coolant exchanging heat with the refrigerant cooled in the chiller 161 lowers to cool the battery system 162.

Figure 5:
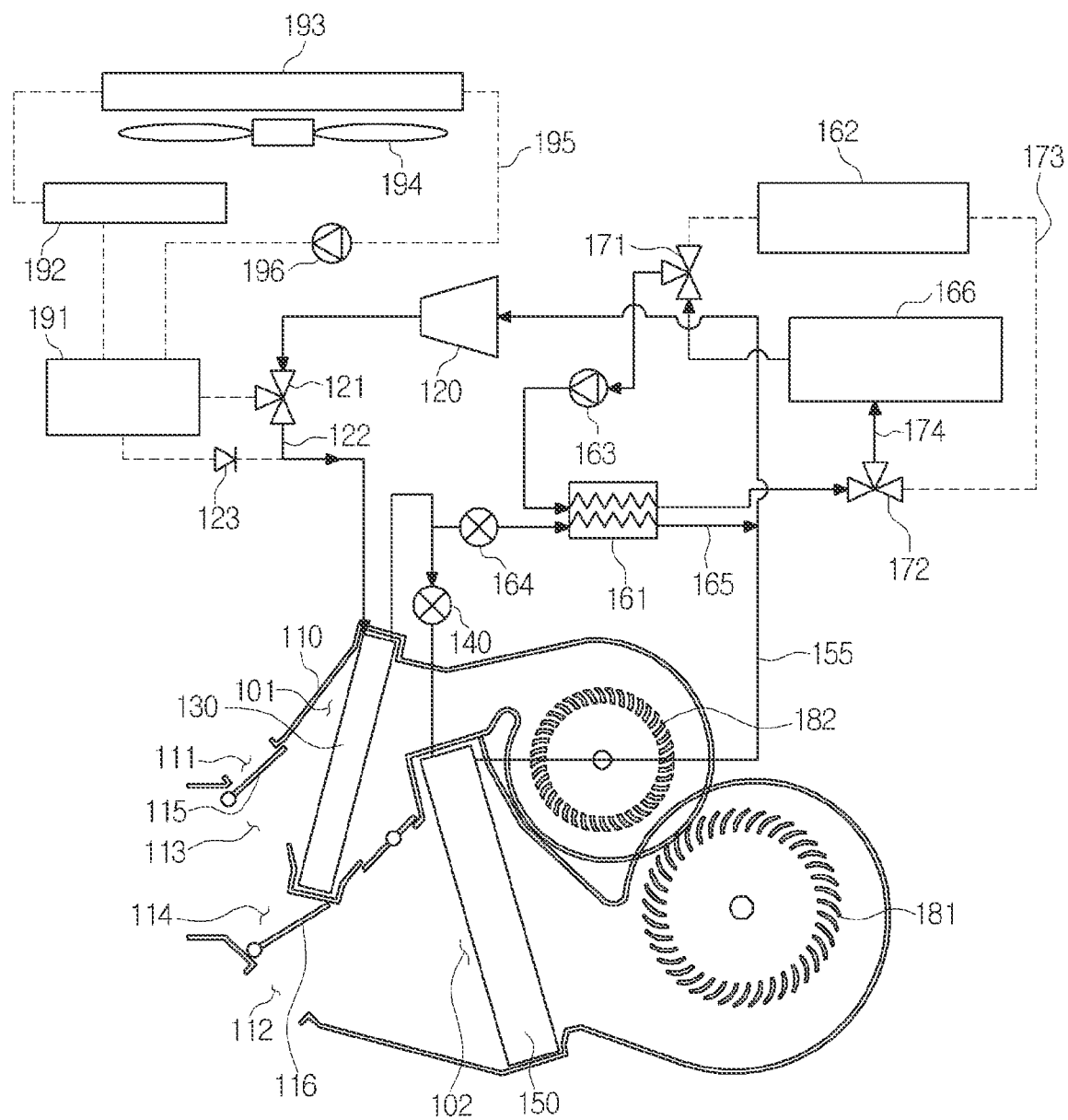
FIG. 5 is a view showing a heating mode of the air conditioner for a vehicle according to the embodiment of the present invention.

FIG. 5 is a view showing a heating mode of the air conditioner for a vehicle according to the embodiment of the present invention.

Referring to FIG. 5, in the heating mode, the warm air heated while passing through the condenser 130 of the first air passageway 101 is discharged to the interior of the vehicle through the warm air outflow port 113 to heat the interior of the vehicle, and at the same time, the cold air cooled while passing through the evaporator 150 of the second air passageway 102 is discharged to the outside of the vehicle through the cold air discharge port 112. The refrigerant and the coolant do not exchange heat in the water cooling condenser 191.

The refrigerant of the refrigerant pipe 155 is discharged from the compressor 120, bypasses the water cooling condenser 191 by actuation of the third three-way valve 121, and passes through the condenser 130. Some of the refrigerant is returned to the compressor 120 after passing the first expansion means 140 and the evaporator 150, and the remainder is returned to the compressor 120 after passing the second expansion means 164 and the chiller 161 along the refrigerant branch pipe 165. The refrigerant passing through the chiller 161 exchanges heat with the coolant of the first coolant pipe 173.

The coolant flowing in the first coolant pipe 173 passes through the chiller 161, flows to the second coolant pipe 174 by actuation of the first three-way valve 172, and then, is returned to the chiller 161 by actuation of the second three-way valve 171 after passing through the drive train component 166. The coolant exchanging heat while passing through the drive train component 166 is heated by waste heat of the drive train component 166, and then, passes through the chiller 161. The refrigerant exchanging heat with the coolant while passing through the chiller 161 recovers the waste heat of the drive train component 166 to raise temperature of the refrigerant returning to the compressor 120. Therefore, the air conditioner for a vehicle according to the present invention enhances heating performance.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

The invention claimed is:

1. An air conditioner for a vehicle, comprising:
a refrigerant circulation system having a refrigerant and compressor, a condenser, an expansion means, and an evaporator;
a first coolant pipe containing a coolant which exchanges heat with a battery system of the vehicle or a drive train component;
a refrigerant branch pipe where some of the refrigerant at a rear end of the condenser and at the front end of the evaporator branches off to bypass the evaporator;
a chiller disposed at the refrigerant branch pipe to exchange heat between the refrigerant of the refrigerant branch pipe and the coolant of the first coolant pipe;
a second coolant pipe exchanging heat with at least one drive train component;
wherein refrigerant of the refrigerant circulation system and coolant of the first coolant pipe are heat-exchanged selectively;
wherein the first coolant pipe has a first circulation pump for circulating the coolant;
wherein a valve system selectively connects the first coolant pipe and the second coolant pipe in sequence to circulate the coolant to at least one among the battery system and the drive train component;
wherein the coolant exchanges heat with the battery system in the cooling mode, and exchanges heat with the drive train component in the heating mode; and
wherein the battery system and the drive train component are connected in parallel with the chiller to cool the battery system in the cooling mode and recover waste heat of the drive train component in the heating mode.

2. The air conditioner for a vehicle according to claim 1, comprising:
an air-conditioning case having a first air passageway and a second air passageway;
the evaporator disposed in any one among the first air passageway and a second air passageway; and
the condenser disposed in the other one among the first air passageway and the second air passageway.

3. The air conditioner for a vehicle according to claim 1, wherein the valve system includes: a first three-way valve disposed at a connected portion between the first coolant pipe and the second coolant pipe located upstream of the battery system in a coolant flow direction; and a second three-way valve disposed at a connected portion between the first coolant pipe and the second coolant pipe located downstream of the battery system in the coolant flow direction.

4. The air conditioner for a vehicle according to claim 1, wherein a refrigerant pipe which connects the compressor, the condenser, the expansion means and the evaporator has a first expansion means disposed at the upstream side of the evaporator in a refrigerant flow direction, and wherein the refrigerant branch pipe branches off between the condenser and the first expansion means and joins between the evaporator and the compressor.

5. The air conditioner for a vehicle according to claim 4, wherein the refrigerant branch pipe has a second expansion means, and wherein the first expansion means is an expansion valve, and the second expansion means is an expansion valve or an orifice.

6. The air conditioner for a vehicle according to claim 1, further comprising:

a third coolant pipe exchanging heat with a power electric module of an electric vehicle.

7. The air conditioner for a vehicle according to claim 6, further comprising:

a water cooling condenser for exchanging heat between the refrigerant of the refrigerant circulation system and the coolant of the third coolant pipe, wherein the third coolant pipe has a second circulation pump for circulating the coolant.

8. The air conditioner for a vehicle according to claim 7, wherein the refrigerant passes through the water cooling condenser in a cooling mode, and bypasses the water cooling condenser in a heating mode.

* * * * *